United States Patent
Ehinger

(10) Patent No.: US 10,443,706 B2
(45) Date of Patent: Oct. 15, 2019

(54) GEARBOX LUBRICATION SYSTEM

(71) Applicant: Bell Helicopter Textron Inc., Fort Worth, TX (US)

(72) Inventor: Ryan T. Ehinger, Southlake, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 0 days.

(21) Appl. No.: 16/181,641

(22) Filed: Nov. 6, 2018

(65) Prior Publication Data
US 2019/0154137 A1  May 23, 2019

Related U.S. Application Data

(63) Continuation of application No. 15/089,671, filed on Apr. 4, 2016, now Pat. No. 10,190,672.

(51) Int. Cl.
| | |
|---|---|
| *B64C 27/06* | (2006.01) |
| *F16H 57/04* | (2010.01) |
| *B64C 27/14* | (2006.01) |
| *B64C 27/00* | (2006.01) |
| *B64D 35/00* | (2006.01) |

(52) U.S. Cl.
CPC ....... *F16H 57/0442* (2013.01); *B64C 27/006* (2013.01); *B64C 27/06* (2013.01); *B64C 27/14* (2013.01); *B64D 35/00* (2013.01); *F16H 57/04* (2013.01); *F16H 57/0445* (2013.01)

(58) Field of Classification Search
CPC .. F16H 57/04; F16H 57/0445; F16H 57/0442; B64C 27/06; B64C 27/006; B64C 27/14; B64D 35/00
See application file for complete search history.

(56) References Cited

U.S. PATENT DOCUMENTS

| | | | | |
|---|---|---|---|---|
| 4,829,850 | A | * 5/1989 | Soloy | B64D 7/00 248/554 |
| 2016/0025206 | A1 | * 1/2016 | Modrzejewski | F16H 57/0442 165/104.34 |
| 2016/0123456 | A1 | * 5/2016 | Goujet | B64C 27/12 184/6.4 |
| 2016/0363208 | A1 | * 12/2016 | Louis | B64D 35/02 |

(Continued)

FOREIGN PATENT DOCUMENTS

JP   H0575416 U   10/1993

OTHER PUBLICATIONS

European Examination Report issued in EP Patent Application Serial No. 16169256.1 dated Jun. 1, 2018, 4 pages.

(Continued)

*Primary Examiner* — Justin M Benedik
(74) *Attorney, Agent, or Firm* — Patent Capital Group

(57) ABSTRACT

According to one embodiment, a rotorcraft includes a body, a rotor blade, a drive system that can be operated to rotate the rotor blade, and an emergency valve control unit. The drive system contains a first gearbox assembly, a second gearbox assembly, a first lubrication system that can deliver lubricant to the first gearbox assembly, and a second lubrication system that can deliver lubricant to the second gearbox assembly. The drive system also contains an emergency valve that can be opened to deliver lubricant from the first lubrication system to the second gearbox assembly. The emergency valve control unit can instruct the emergency valve to open.

20 Claims, 8 Drawing Sheets

(56) References Cited

U.S. PATENT DOCUMENTS

2017/0152935 A1\* 6/2017 Filter .................. B64C 29/0025
2017/0284535 A1 10/2017 Ehinger

OTHER PUBLICATIONS

European Examination Report issued in EP Patent Application Serial No. 16169256.1 dated Nov. 17, 2017, 5 pages.
European Search Report issued in EP Patent Application Serial No. 16169256.1 dated Oct. 6, 2017, 4 pages.
Notice of Allowance issued in U.S. Appl. No. 15/089,671 dated Sep. 21, 2018, 5 pages.
USPTO Non-Final Office Action issued in U.S. Appl. No. 15/089,671 dated May 3, 2018, 9 pages.
European Examination Report issued in EP Patent Application Serial No. 16169256.1 dated Jan. 3, 2019, 4 pages.

\* cited by examiner

GEARBOX LUBRICATION SYSTEM

CROSS-REFERENCE TO RELATED APPLICATION

This application is a continuation and claims the benefit of priority under 35 U.S.C. § 120 of U.S. application Ser. No. 15/089,671, filed on Apr. 4, 2016, entitled "GEARBOX LUBRICATION SYSTEM," Inventor Ryan T. Ehinger. The disclosure of the prior application is considered part of and is incorporated in its entirety by reference in the disclosure of this application.

TECHNICAL FIELD

This invention relates generally to a rotorcraft, and more particularly, to a lubrication system for rotorcraft gearboxes.

BACKGROUND

Rotorcraft drive systems can include various components that produce and transfer power. For example, engines and gearboxes are standard components. Such components generate heat and require lubrication. Excessive levels of heat can cause premature failure and create safety risks. Proper lubrication serves to reduce heat generation and assist in heat removal from moving components within gearboxes.

Typically, rotorcraft use a variety of primary lubrication systems to provide wear protection and heat transfer for moving components. Under normal operating conditions, primary lubrication systems provide proper lubrication and heat removal. However, primary lubrication systems can fail to result in excessive heat generation, wear, and failure of components, such as bearings or gears within a gearbox.

Rotorcraft are generally required to maintain manageable flight operations for selected durations of time if the primary lubrication system fails. One method used to satisfy the requirements of manageable flight during a lubrication system failure is to use a secondary, emergency lubrication system to operate when the primary lubrication system fails. This method increases the overall weight of the rotorcraft. Therefore, an improved method of controlling heat transfer from an aircraft gearbox is desired.

SUMMARY

Particular embodiments of the present disclosure may provide one or more technical advantages. A technical advantage of one embodiment may include the capability to deliver supplemental lubricant to a gearbox when the rotorcraft experiences a reduction in lubricant pressure. A technical advantage of one embodiment may include the capability to reduce the friction experienced by components of a gearbox when the rotorcraft experiences a reduction in lubricant pressure. A technical advantage of one embodiment may include the capability to increase the amount of time that a rotorcraft can operate with a reduced lubricant pressure. A technical advantage of one embodiment may include the ability to use preheated lubricant in the event of a lubrication system failure. A technical advantage of one embodiment may include the reduction of weight of the rotorcraft. A technical advantage of one embodiment may include the reduction in maintenance burdens. A technical advantage of one embodiment may include the extension of lubricant life.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1:
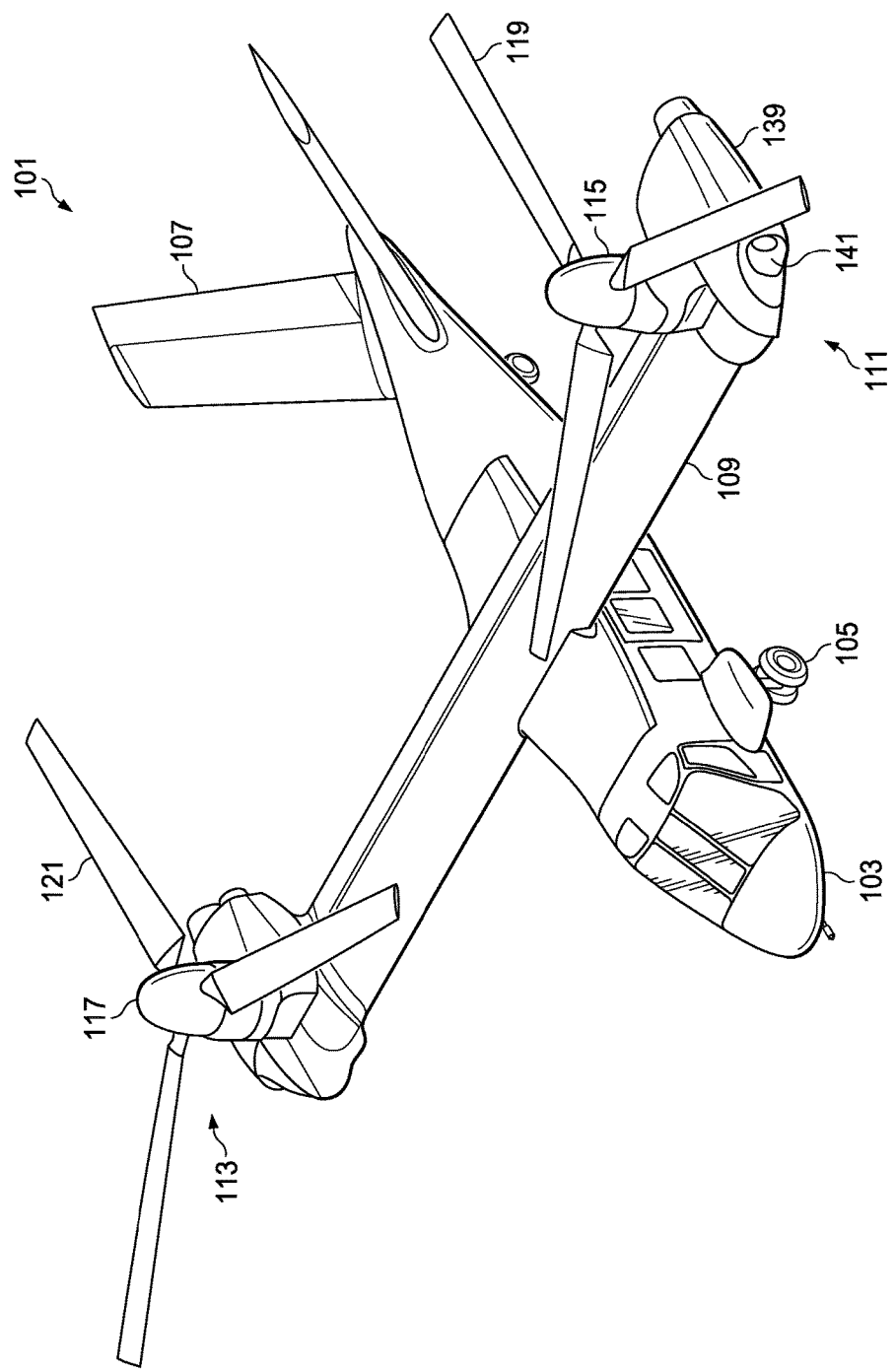
FIG. 1 shows a perspective view of a tiltrotor aircraft in helicopter mode, according to one example embodiment.
Figure 2:
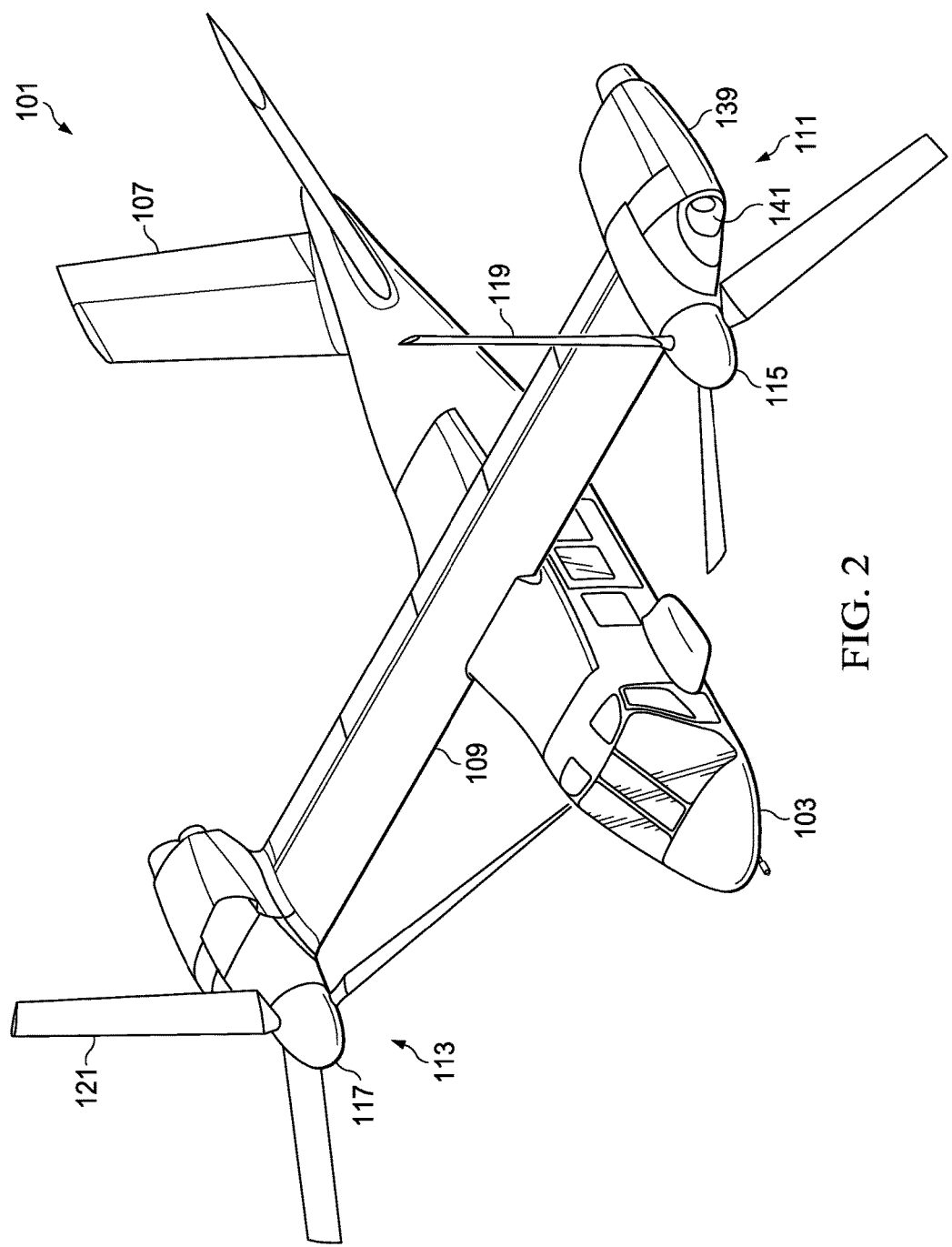
FIG. 2 shows a perspective view of a tiltrotor aircraft in airplane mode, according to one example embodiment.

FIGS. 1 and 2 in the drawings illustrate a tiltrotor aircraft 101, according to one example embodiment. Tiltrotor aircraft 101 can include a fuselage 103, a landing gear 105, a tail member 107, a wing 109, a drive system 111, and a drive system 113. Each drive system 111 and 113 includes a fixed engine 139 and a rotatable proprotor 115 and 117, respectively. Each rotatable proprotor 115 and 117 have a plurality of rotor blades 119 and 121, respectively, associated therewith. The position of proprotors 115 and 117, as well as the pitch of rotor blades 119 and 121, can be selectively controlled in order to selectively control direction, thrust, and lift of tiltrotor aircraft 101.

FIG. 1 illustrates tiltrotor aircraft 101 in helicopter mode, in which proprotors 115 and 117 are positioned substantially vertical to provide a lifting thrust. FIG. 2 illustrates tiltrotor aircraft 101 in an airplane mode in which proprotors 115 and 117 are positioned substantially horizontal to provide a forward thrust in which a lifting force is supplied by wing 109. It should be appreciated that tiltrotor aircraft can be operated such that proprotors 115 and 117 are selectively positioned between airplane mode and helicopter mode, which can be referred to as a conversion mode.

The drive system 113 is substantially symmetric to the drive system 111; therefore, for sake of efficiency, certain features will be disclosed only with regard to drive system 111. However, one of ordinary skill in the art would fully appreciate an understanding of drive system 113 based upon the disclosure herein of drive system 111.

Further, drive systems 111 and 113 are illustrated in the context of tiltrotor aircraft 101; however, drive systems 111 and 113 can be implemented on other tiltrotor aircraft. For example, an alternative embodiment may include a quad tiltrotor that has an additional wing member aft of wing 109; the additional wing member can have additional drive systems similar to drive systems 111 and 113. In another embodiment, drive systems 111 and 113 can be used with an unmanned version of tiltrotor aircraft 101. Further, drive systems 111 and 113 can be integrated into a variety of tiltrotor aircraft configurations. Additionally, other drive systems are contemplated. For example, one example is a gearbox arrangement to provide torque to a rotor system of a helicopter.

Figure 3:
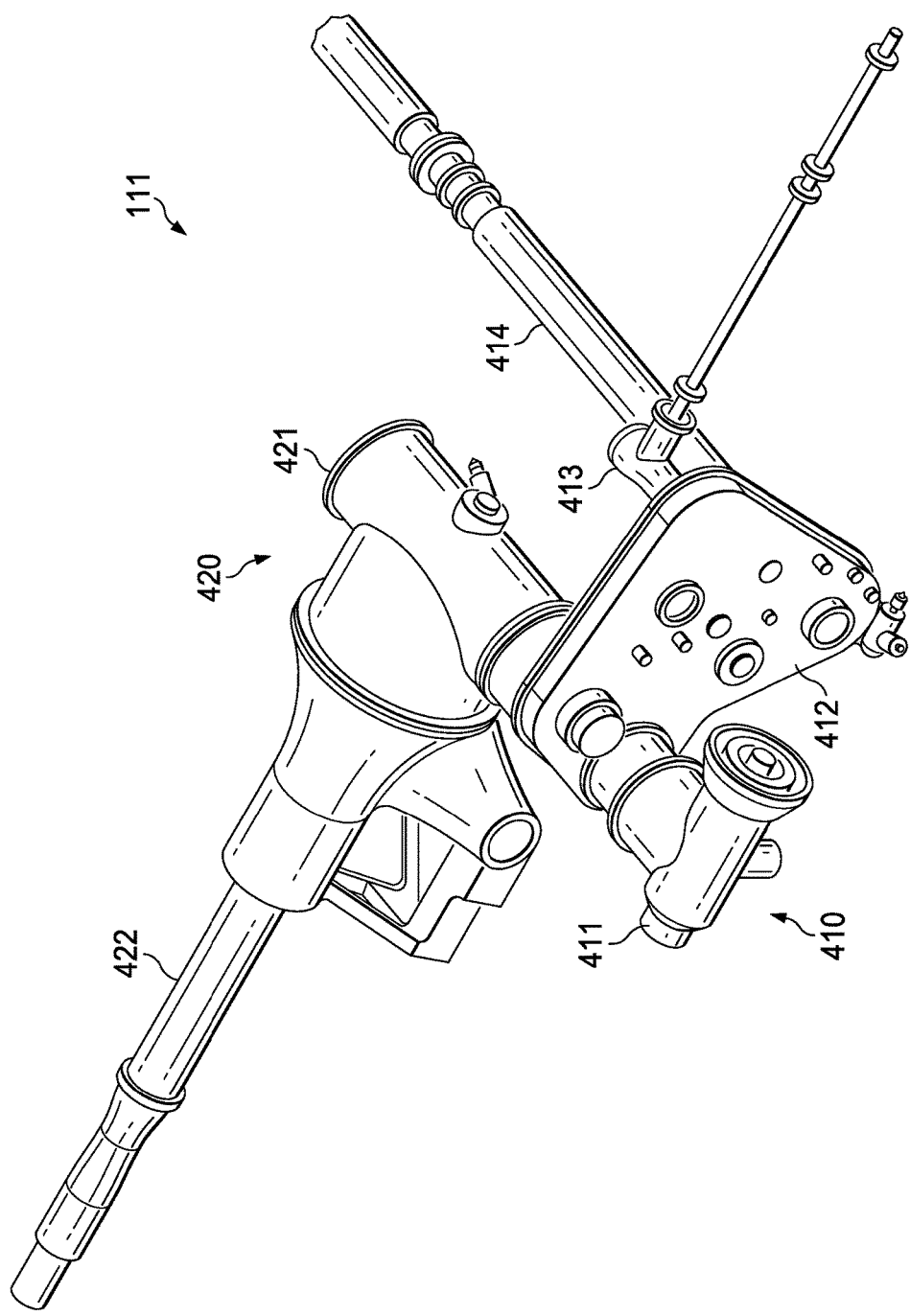
FIG. 3 shows a perspective view of the drive system of the tiltrotor aircraft of FIGS. 1 and 2, according to one example embodiment.

FIG. 3 shows a perspective view of drive system 111, according to one example embodiment. Drive system 111 may include a first gearbox assembly 410 and a second gearbox assembly 420. First gearbox assembly 410 may include spiral bevel gearbox 411, interconnect gearbox 412, blower gearbox 413, interconnect driveshaft 414, and engine 139 (not shown in FIG. 3). Second gearbox assembly 420 may include proprotor gearbox 421, and mast 422.

Engine 139 may be fixed relative to wing 109 of aircraft 101 and can provide torque via an engine output shaft (not shown) to spiral bevel gearbox 411. Spiral bevel gearbox 411 can include spiral bevel gears to change torque direction by approximately ninety degrees from engine 139 to interconnect gearbox 412 via a clutch. Interconnect gearbox 412 can include a plurality of gears, such as helical gears, in a gear train that are coupled to interconnect driveshaft 414, blower gearbox 413, and second gearbox assembly 420. The interconnect gearbox 412 can also be configured to provide power to various system accessories such as alternators, lube and scavenge pumps, hydraulic pumps, and generators.

Proprotor gearbox 421 can include a plurality of gears that can be configured to transfer power and reduce rotational speed to mast 422. The blower gearbox 413 can be mounted to interconnect gearbox 412 and can be configured to provide torque to the oil cooler blower fan, which may be used to draw in air for lubricant temperature reduction. Interconnect driveshaft 414 can be configured to provide a torque path that enables a single engine to provide torque to both drive systems 111 and 113 in the event of a failure of one of the engines.

Gears, bearings, and other mechanical components of drive system 111 are subject to wear and heat generation due to contact with other components. These mechanical components may be lubricated to reduce friction and transfer heat away from the components. Lubrication is the process or technique employed to reduce wear of one or both surfaces in close proximity, and moving relative to each other, by interposing a substance, such as a lubricant, between the surfaces to help carry the load (pressure generated) between the opposing surfaces.

A lubricant is a substance introduced to reduce friction between moving surfaces. Examples of lubricants can include oil, biolubricants derived from plants and animals, synthetic oils, solid lubricants, and aqueous lubricants. Example transmission oils for gearbox 160 may include oils meeting specifications MIL-PRF-23699 (5 cSt), DOD-L-7808 (3-4 cSt), DOD-PRF-85734 (5 cSt), and other oils in the 9 cSt to 10 cSt viscosity range. Drive system 111 may include one or more lubrication systems to provide lubricant to the mechanical components of drive system 111.

Figure 4:
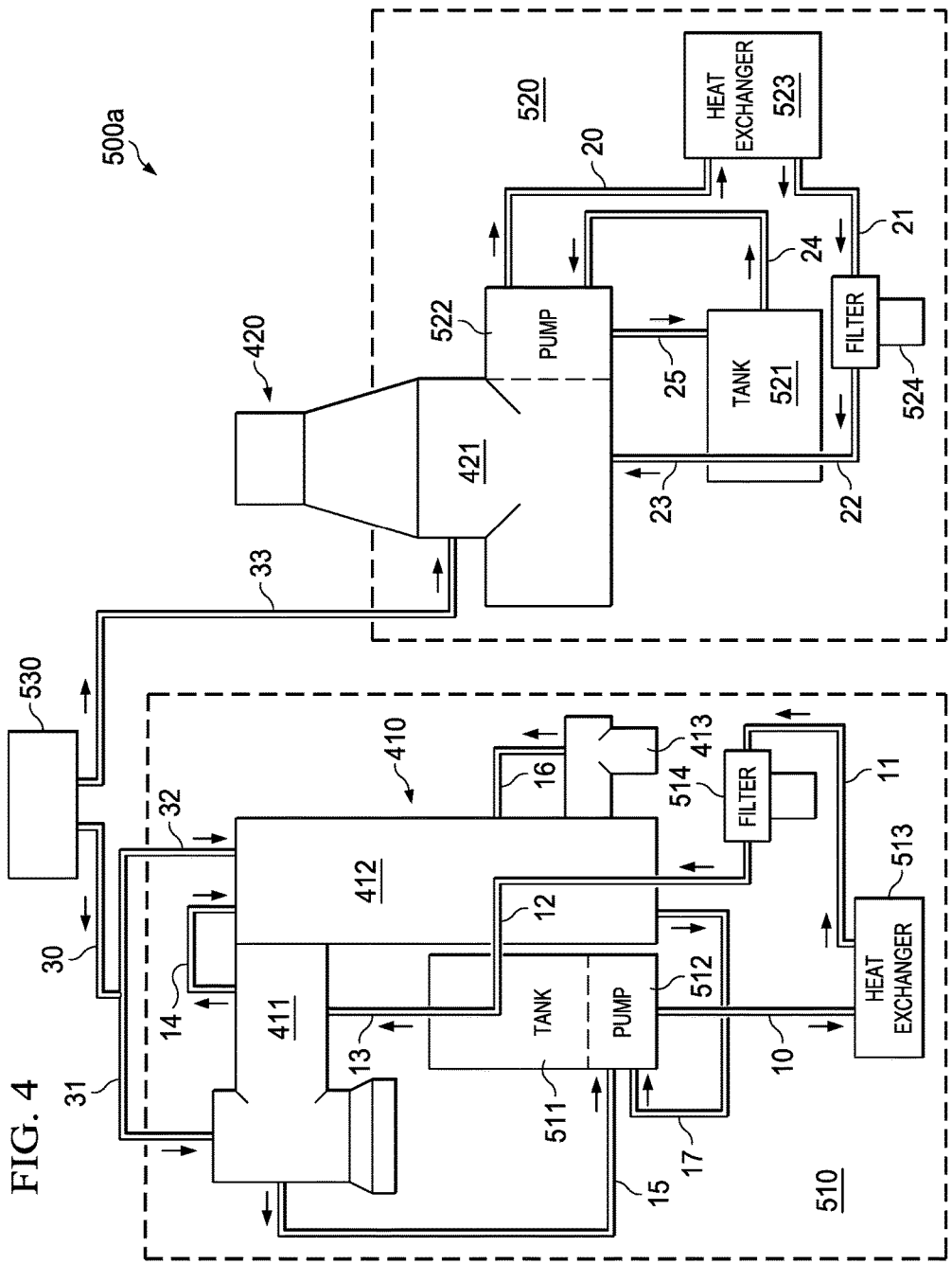
FIG. 4 shows a schematic view of a lubrication arrangement of the drive system of FIG. 3, according to one example embodiment.

FIG. 4 shows a schematic view of a lubrication arrangement 500a of drive system 111, according to one example. Lubrication arrangement 500a can include a first lubrication system 510 and a second lubrication system 520. Lubrication system 510 may provide lubricant to components of first gearbox assembly 410, whereas lubrication system 520 may provide lubricant to components of second gearbox assembly 420. Lubrication system 510 can include lubricant tank 511, pump 512, heat exchanger 513, filter 514, and lubrication lines 10 through 17. Lubrication system 520 may include lubricant tank 521, pump 522, heat exchanger 523, filter 524, and lubrication lines 20 through 25. Lubrication systems 510 and 520 may also include other components such as one or more sensors 610, pressure regulators, flowmeters, check valves, and jets, which are not depicted in the schematic view of FIGS. 4 and 5.

Tanks 511 and 521 may represent reservoirs that store lubricant within lubrication systems 510 and 520, respectively. Tanks 511 and 521 may be integral with the housing of one of the gearboxes, such as interconnect gearbox 412 or proprotor gearbox 421, or separate from the housings of the gearboxes. Pumps 512 and 522 may represent devices that can be configured to circulate pressurized lubricant throughout lubrication systems 510 and 520, respectively. Heat exchangers 513 and 523 may be devices configured to lower the temperature of the lubricant before the lubricant is applied to the various components that generate heat. Filters 514 and 524 may represent devices configured to remove contaminants from the lubricant. Jets, which are not shown in the schematic views of FIGS. 4 and 5, may be devices configured to dispense lubricant on components of drive system 111 that are subject to friction and/or generate heat, such as gears and bearing.

Figure 5:
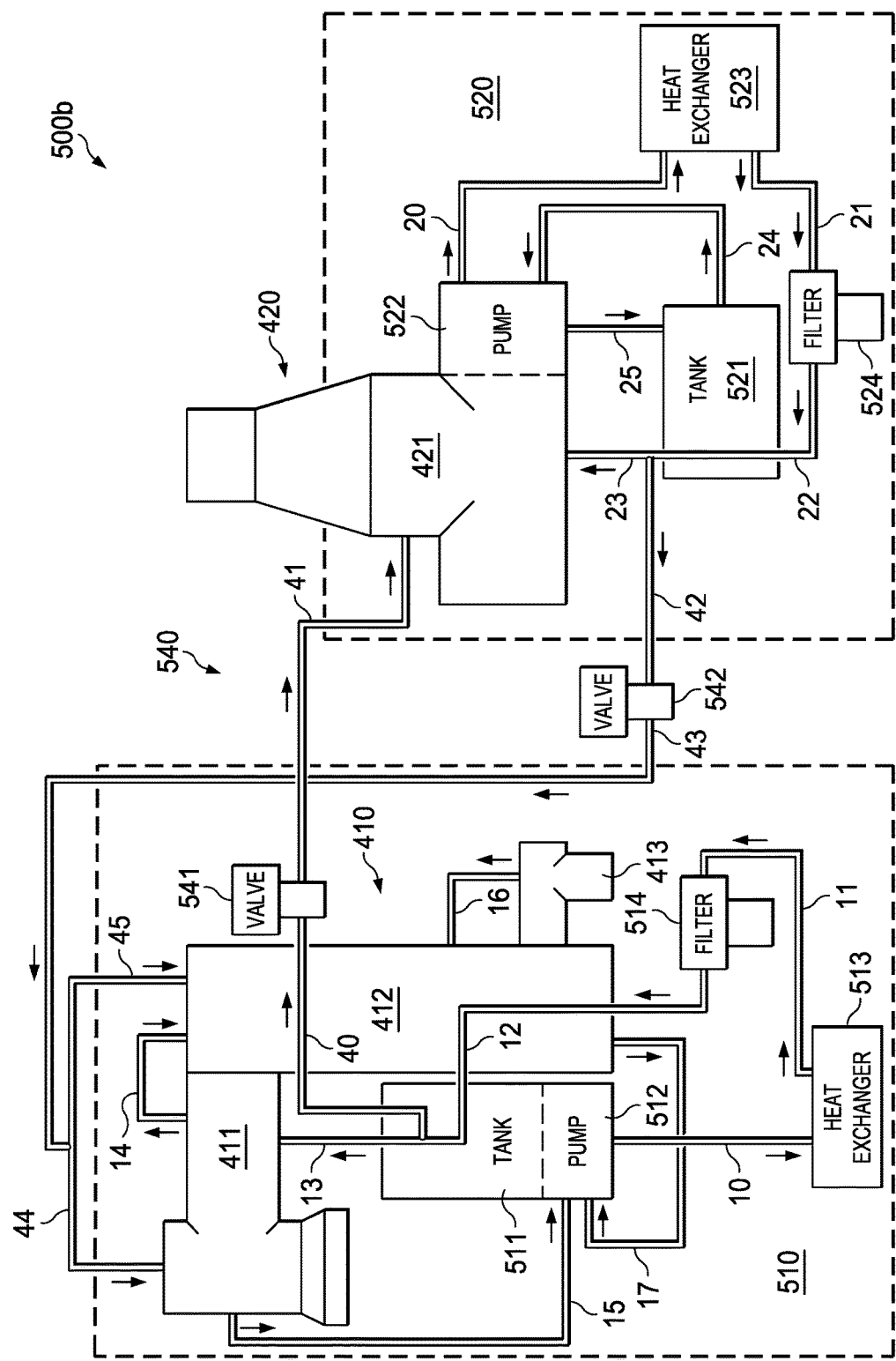
FIG. 5 shows a schematic view of a lubrication arrangement of the drive system of FIG. 3, according to one example embodiment.

Sensors 610, which are not shown in the schematic view of FIGS. 4 and 5, may represent devices that can be configured to detect one or more rotorcraft parameters output by rotorcraft 101. For example, lubrication arrangement 500a may include one or more pressure sensors 610 that can detect the pressure of the lubricant within lubrication system 510 or 520. Examples of pressure sensors may include strain-gauge sensors, capacitive sensors, electromagnetic sensors, piezoelectric sensors, optical sensors, potentiometric sensors, resonant sensors, and thermal sensors, to name a few. In another example embodiment, lubrication arrangement 500a may include one or more temperature sensors that can detect the temperature of the lubricant in lubrication system 510 or 520. It should be noted that rotorcraft 101, drive system 111, or lubrication arrangement 500a may include a plurality of sensors that are of different types. For example, lubrication arrangement 500a can include both a pressure sensor and a temperature sensor.

Lubrication lines 10 through 17 and 20 through 25 may represent fluid lines that connect various components of lubrication system 510 and 520. Lubrication lines 10 through 17 and 20 through 25 may represent rigid pipelines, such as core passages in the housing of a gearbox, or flexible hoses, such as fluoropolymer tubing. The type of lubrication lines used may depend on the location of the line or expected fluid pressure within the line. Lubrication lines 10 through 17 and 20 through may include other components such as swivels and quick disconnect couplings. In some examples, lubrication lines 10 through 17 and 20 through 25 may be collapsible in order to reduce residual lubricant during storage and when lubricant is not being flowed through the line.

As mentioned, lubrication lines 10 through 17 and 20 through 25 may fluidly connect various components of lubrication system 510 or 520. Lubrication lines 10 through 17 may fluidly connect components of lubrication system 510. For example, as can be seen in FIGS. 4 and 5, pump 512 may deliver lubricant from tank 511 into lubrication line 10. The lubricant may then travel from lubrication line 10 to heat exchanger 513 where the lubricant is cooled. Next, the lubricant may travel from heat exchanger 513, through line 11, to filter 514 where particles may be removed from the lubricant. From filter 514, the lubricant may travel through line 12 to one or more gearboxes within lubrication system 510, such that the lubricant gets delivered to moving components within the one or more gearboxes. The lubricant then, after traveling through lines 13 through 17, returns to tank 511.

Lubrication lines 20 through 25 may fluidly connect components of lubrication system 520. For example, pump 522 may deliver lubricant from tank 521 to lubricant line 20, from line 20 to heat exchanger 523 where the lubricant is cooled. From heat exchanger 523, the lubricant may then be delivered to filter 524, via line 21, where particles may be removed from the lubricant. From filter 524, the lubricant may travel through line 22 to oil tank 521.

Under normal operating conditions, lubrication systems 510 and 520 provide proper lubrication to the moving components of first gearbox assembly 410 and second gearbox assembly 420, respectively. The lubricant pressure within the gearboxes of first gearbox assembly 410 and second gearbox assembly 420 may be at a normal level, for example, fifty PSI (pounds per square inch). Additionally, during normal operating conditions, first lubrication system 510 may not be in fluid communication with second lubrication system 520.

If for example, proper lubrication is not provided to the moving components of gearbox assemblies 410 or 420 or lubrication system 510 or 520 experience a loss of lubrication, the moving components of gearbox assembly 410 or 420 may experience excessive wear or the failure of components. One example cause of a loss of lubrication may be a leak between the casing of one of the gearboxes and one of its components. In some loss of lubrication circumstances, the lubricant pressure within a gearbox of gearbox assembly 410 or 420 may be reduced to an undesired level. For example, the pressure may drop below thirty PSI, and in some instances may drop to zero PSI.

Rotorcraft are generally required to maintain manageable flight operations for selected durations of time if the rotorcraft experiences low lubricant pressure, such as during a loss of lubrication situation or lubrication system failure. For example, an aviation agency may require that the loss of lubrication will not prevent continued safe operation for at least thirty minutes after perception by the flight crew of the lubrication system failure or loss of lubrication. Therefore, some rotorcraft may also include a secondary lubrication system, such as emergency lubrication system 530.

Emergency lubrication system 530 may represent a system that has a secondary lubricant tank and a pressurizing device.

The lubricant tank of emergency lubrication system 530 may represent a reservoir configured to contain lubricant. In one example, the lubricant tank of emergency lubrication system 530 may be configured to contain approximately seven gallons of lubricant. Examples of a pressurizing device that can be used in emergency lubrication system 530 may be a mechanically driven pump, a hydraulically driven pump, an electrically driven pump, or a gravity feed system.

In a loss of lubrication event, lubricant may be introduced from the emergency lubrication system 530 to the working components of gearbox assembly 410 and/or 420. Lubricant may be provided from the secondary lubrication tank of emergency lubrication system 530 to gearbox assembly 410 through lubrication lines 30 through 32 and emergency line jets (not shown), and/or to gearbox assembly 420 through lubrication lines 33 and emergency line jets (not shown).

Even though the use of emergency lubrication system 530 has some advantages, such as increasing the amount of time the rotorcraft is operable, this method may have some potential disadvantages, such as increasing the weight of the aircraft due to the extra tank, pump, and lubricant that may be included in emergency lubrication system 530. Therefore, a new system and method for providing emergency lubrication is needed.

FIG. 5 shows a schematic view of a lubrication arrangement 500b, according to one example embodiment. Lubrication arrangement 500b features emergency lubrication system 540. Emergency lubrication system 540 can include emergency lubrication lines 40 through 45, valves 541 and 542, and one or more emergency jets (not shown).

Emergency lubrication lines 40 through 45 may represent rigid pipelines, such as core passages in the housing of a gearbox, or flexible hoses, such as fluoropolymer tubing. The type of lubrication lines used may depend on the location of the line or expected fluid pressure within the line. Lubrication lines 40 through 45 may include other components such as swivels and quick disconnect couplings. Lubrication lines 40 through 45 can be configured such that they deliver lubricant to emergency jets (not shown).

Valves 541 and 542 can represent devices that regulate the flow of a fluid by opening or closing a passageway. In one example, valve 541 and/or 542 can be a solenoid valve that can be electromechanically operated. An electric current may control the solenoid valve, and the valve can be switched open to allow a flow of lubricant or closed to stop a flow of lubricant.

In one example embodiment, emergency lubrication system 540 does not include an extra lubrication tank that provides lubricant to gearbox assembly 410 and/or gearbox assembly 420. However, extra lubricant can be stored within tank 511 and/or tank 521. For example, two extra gallons may be stored within tank 511, and seven extra gallons may be stored within tank 521.

During a loss of lubrication event in one of the gearbox assemblies, a lubrication system that under normal operating conditions supplies lubricant to another gearbox assembly may also supply lubricant to the gearbox assembly that is experiencing a loss of lubrication event. For example, if second gearbox assembly 420 experiences a loss of lubrication event, lubricant can be supplied to second gearbox assembly 420 by lubrication system 510 by opening valve 541.

Lubricant may flow from lubrication system 510 to lubricant line 40, from line 40 to valve 541, from valve 541 to line 41, from line 41 to gearbox assembly 420. The flow of lubricant can be caused by the pressure of lubricant in lubrication system 510 that is created by pump 512 of lubrication system 510. In one example, emergency jets can be used to supply the lubricant from lubrication system 510 to gearbox assembly 420. The emergency jets may allow for a slower flow rate of lubricant than the normal operating jets in order to conserve lubricant.

If gearbox assembly 410 experiences loss of lubrication, valve 542 can be opened to allow a flow of lubricant from lubrication system 520 to gearbox assembly 410. Lubricant may flow from lubrication system 520 to lubrication line 42, from line 42 to valve 542, from valve 542 to line 43, from line 43 to lines 44 and 45, from lines 44 and 45 to gearbox assembly 410. The flow of lubricant can be caused by the pressure of lubricant in lubrication system 520 that is created by pump 522 of lubrication system 520. In one example, emergency jets can be used to supply the lubricant from lubrication system 510 to gearbox assembly 410. The emergency jets may allow for a slower flow rate of lubricant than the normal operating jets in order to conserve lubricant.

Figure 6:
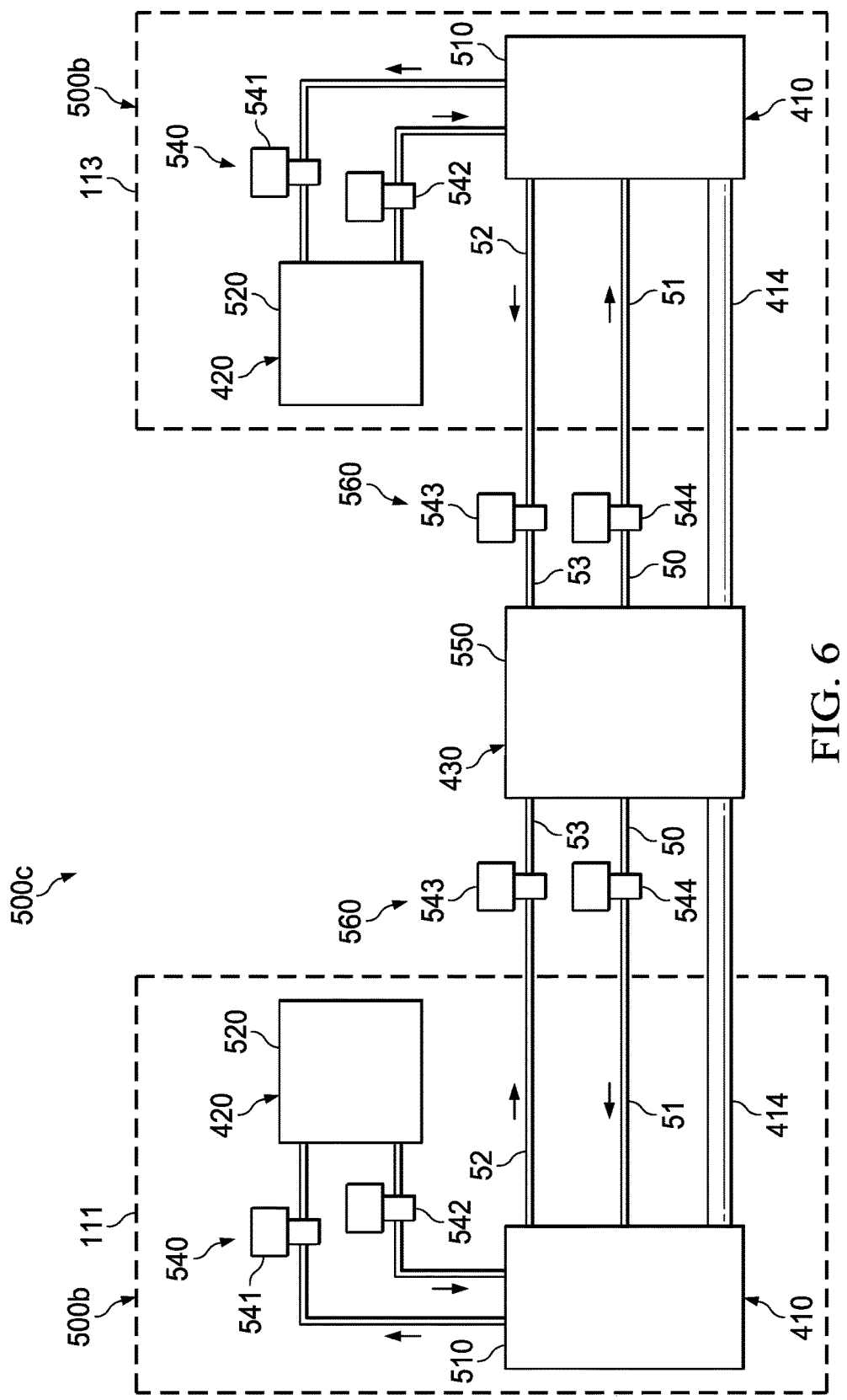
FIG. 6 shows a schematic view of a lubrication arrangement of an aircraft, according to one example embodiment.

FIG. 6 shows a schematic view of a lubrication arrangement 500c of an aircraft according to one example embodiment. In this example, aircraft 101 features a third gearbox assembly 430 located between drive system 111 and drive system 113. Torque from drive system 111 can be transferred from first gearbox assembly 410, through interconnect drive shaft 414, to third gearbox assembly 430. Torque from drive system 113 can also be transferred from first gearbox assembly 410, through interconnect drive shaft 414, to third gearbox assembly 430. In the event of an engine failure, power from one of drive system 111 or drive system 113 can be distributed to the other through the interconnect drive shafts 414 and the third gearbox assembly 430.

Third gearbox assembly 430 can have a lubrication system, such as lubrication system 550, that includes components such as a pump, heat exchanger, filter, tank, and lubrication lines. Under normal operating conditions, lubrication system 550 provides proper lubrication to the moving components of gearbox assembly 430 and the lubricant pressure within gearbox 430 may be at a normal level. During normal operating conditions, lubrication system 550 may not supply lubricant to gearbox assembly 410 or 420.

If for example, proper lubrication is not provided to the moving components of gearbox assembly 430 or lubrication system 550 experiences a loss of lubrication, lubricant can be shared from lubrication system 510 and/or 520 to gearbox assembly 430, via emergency lubrication system 560, according to one example embodiment.

For example, if gearbox assembly 430 experiences loss of lubrication, valve 543 can be opened to allow a flow of lubricant from lubrication system 510 to gearbox assembly 430. Lubricant may flow from lubrication system 510 to lubricant line 52, from line 52 to valve 543, from valve 543 to line 53, and from line 53 to gearbox assembly 430. The flow of lubricant can be caused by the pressure of lubricant in lubrication system 510 that is created by pump 512 of lubrication system 510. Additionally, valve 542 can also be opened to allow a flow of lubricant from lubrication system 520 to lubrication system 510, from lubrication 510 to gearbox assembly 430.

Similarly, if lubrication system 510 and/or 520 experience a loss of lubrication, valve 544 can be opened to allow a flow of lubricant from lubrication system 550 to lubrication system 510. Lubricant may flow from lubrication system 550 to lubricant line 50, from line 50 to valve 544, from valve 544 to line 51, and from line 51 to lubrication system 510. Additionally, valve 541 can also be opened to allow a flow of lubricant from lubrication system 550 to lubrication system 510, from lubrication system 510 to gearbox assembly 420.

In one example embodiment, lubricant from lubrication systems 510, 520, and 550 is shared when neither lubrication system 510, 520, nor 550 are experiencing loss of lubrication. The sharing of lubricant in non-emergency situations may have several advantages. First, the sharing of lubricant between the lubrication systems may extend the life of the lubricant. For example, because some of the gearboxes, such as gearbox 411, may increase the temperature of the lubricant more than other gearboxes, such as gearbox 412, the lubricant is allowed to cool within the gearboxes that produce less heat. Additionally, lubricant may also be cooled by convection via the lubricant lines that run along the wing of rotorcraft 101.

Second, when lubricant is shared between the lubrication systems, it may reduce the frequency of lubricant changes. For example, lubricant may have to be changed more often in gearboxes that generate more heat than in gearboxes that generate less heat. Third, the sharing of lubricant between lubrication systems may reduce the number of sensors, such as oil quality sensors. For example, if lubricant was shared between the lubrication systems, it may only be necessary to have one oil quality sensor, as opposed to one oil quality sensor for each lubrication system.

Lubrication arrangement 500c can have lubrication systems 510, 520, and 550 fluidly connected in series. However, teachings of certain example embodiments recognize that it may be beneficial to have lubrication systems 510, 520, and 550 fluidly connected in parallel.

Figure 7:
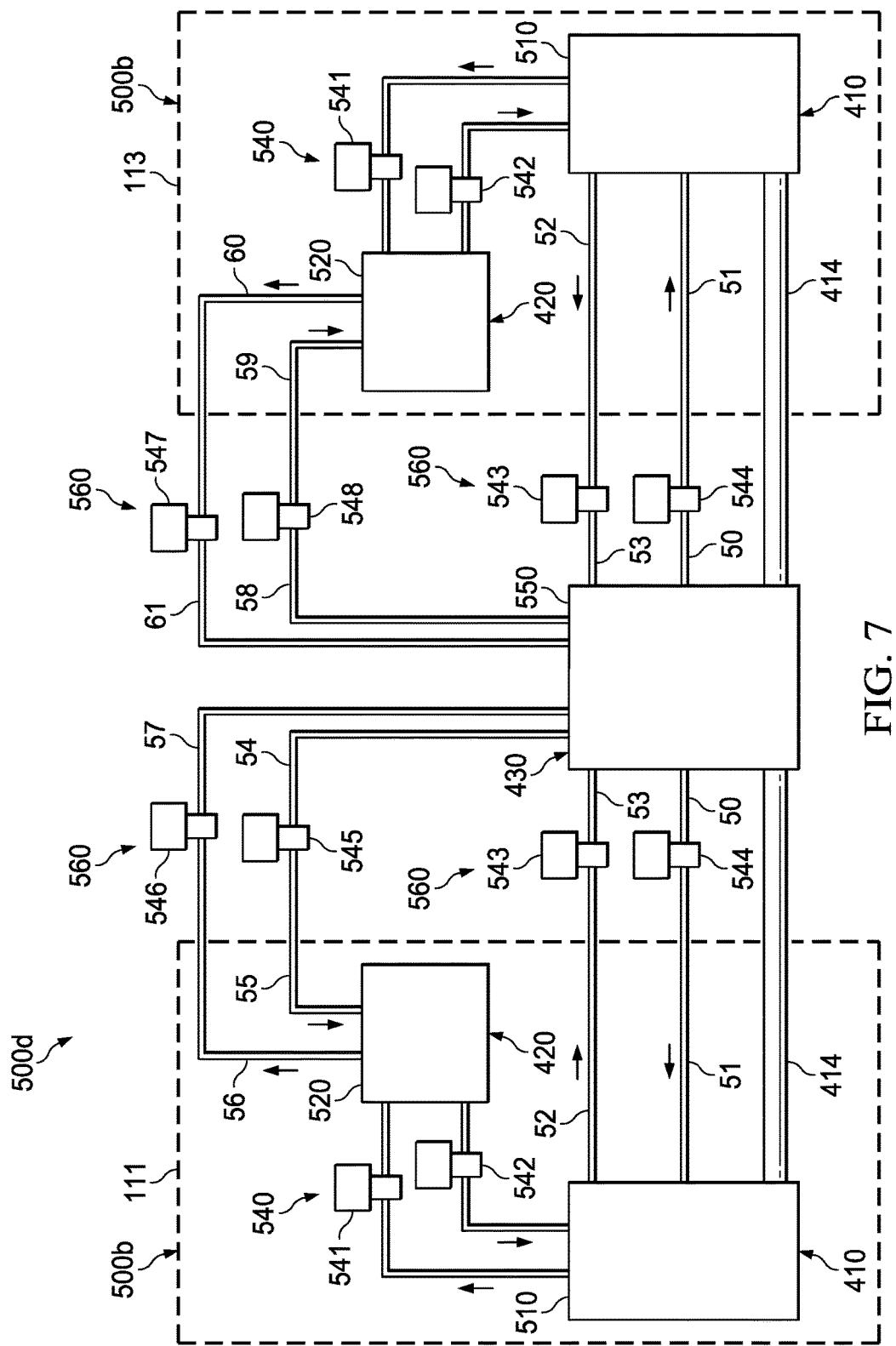
FIG. 7 shows a schematic view of a lubrication arrangement of an aircraft, according to one example embodiment.

FIG. 7 shows a schematic view of a lubrication arrangement 500d of an aircraft, according to one example embodiment. Lubrication arrangement 500d is similar to lubrication arrangement 500c. However, the example of lubrication arrangement 500d has lubrication systems 510, 520, and 550 in parallel. Lubrication arrangement 500d may include all the same components as lubrication 500c. Lubrication arrangement 500d may also include valves 545 through 548 and lines 54 through 61. In this example, lubricant may be shared directly from lubrication system 550 to lubrication system 520, and vice-versus. Having the lubrication systems connected in parallel may be beneficial if two or more gearbox assemblies experience a loss of lubrication.

Figure 8:
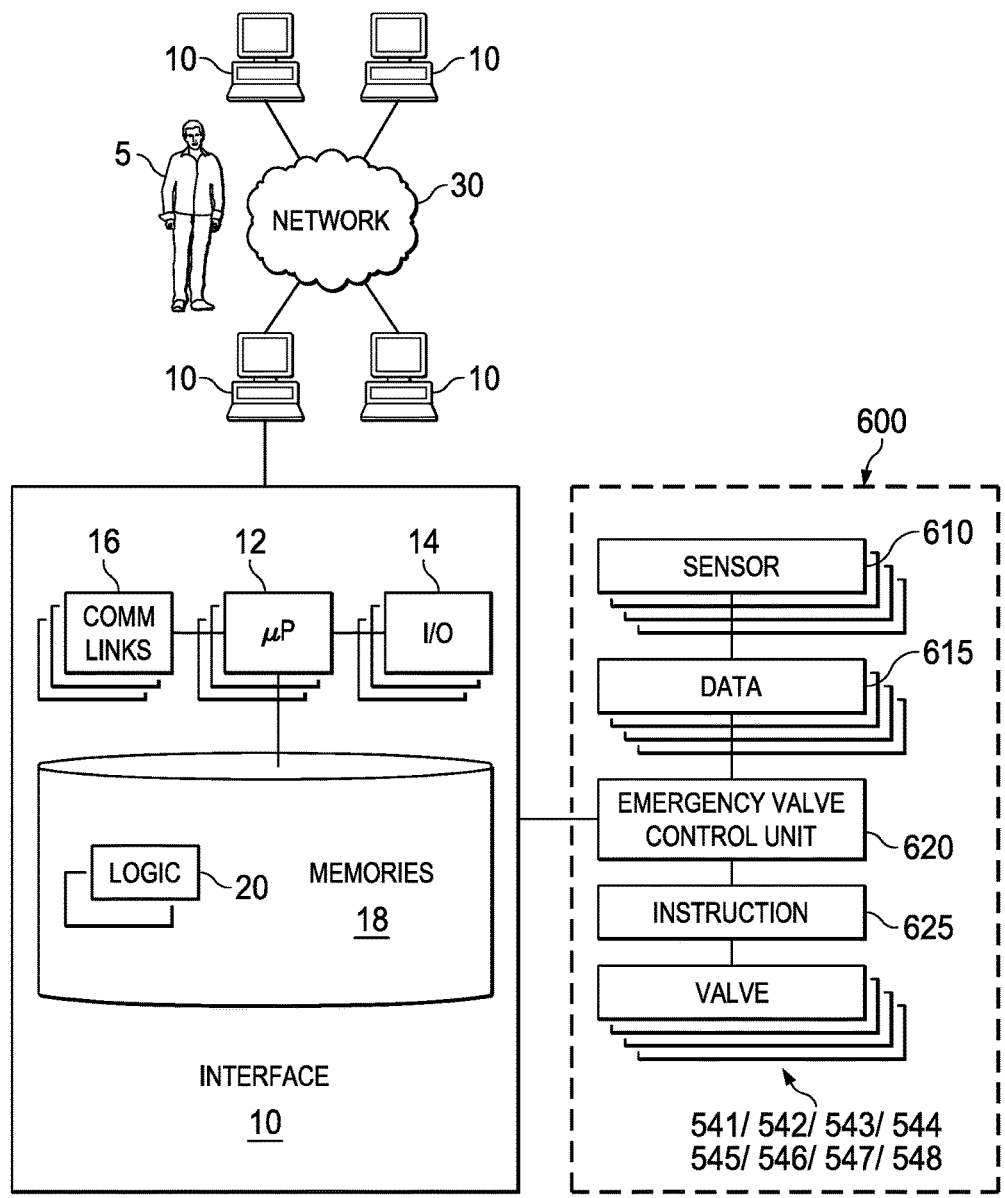
FIG. 8 shows a schematic view of an emergency valve control system, according to one example embodiment.

FIG. 8 shows a schematic view of an emergency valve control system 600, according to one example embodiment. Emergency valve control system 600 can include an emergency valve control unit 620 that can be configured to receive data 615 from one or more sensors 610 of aircraft 101. Emergency valve control unit 620 may also be configured to send instructions 625 to valves 541 through 548. Emergency valve control unit 620 may represent a computer that is configured to receive data 615; data 615 may represent one of more rotorcraft parameters, such as the pressure of lubricant within lubrication system 510, 520, or 550, or the temperature of the lubricant in lubrication system 510, 520, or 550.

Emergency valve control unit 620 may analyze data 615 to determine whether a loss of lubricant event has occurred. In one example embodiment, emergency valve control unit 620 may analyze data 615 to determine whether the loss of lubricant event occurred within gearbox assemblies 410, 420, or 430.

Emergency valve control unit 620 may analyze data 615 by comparing data 615 to a threshold value. In one example embodiment, the threshold value may be a specific pressure within first lubrication system 510, such as thirty PSI. Therefore, emergency valve control unit 620 may receive and monitor the lubricant pressure within first lubrication system 510 and compare it to the threshold value of thirty PSI. If the pressure within first lubrication system 510 is reduced to a value less than thirty PSI, emergency valve control unit 620 would instruct valve 542 and/or valve 544 to open in order to allow supplemental lubrication to be provided to the working components of gearbox 410.

During a loss of lubricant event within lubrication system 510, emergency valve control unit 620 may send an instruction 625 to valve 542 and/or 544 to open. During a loss of lubricant event within lubrication system 520, emergency valve control unit 620 may send an instruction 625 to valve 541 and/or 544 to open. During a loss of lubricant event within lubrication system 550, emergency valve control unit 620 may send an instruction 625 to valve 542 and/or 543 to open. Emergency valve control unit 620 may also send an instruction 625 to valve 541, 542, and/or 543 to close.

Emergency valve control unit 620 may also receive and analyze data from gearboxes that are not experiencing a loss of lubrication. For example, emergency valve control unit 620 may receive information from lubricant monitoring sensors that detect the level of lubricant in a non-failing lubrication system that is supplying lubricant to a failing lubrication system. If the level of lubricant in a non-failing lubrication system is reduced to a level below a threshold value, emergency valve control unit 620 may send an instruction to the emergency valve to close or reduce the flow of lubricant to the failing lubrication system.

Teachings of certain embodiments recognize that emergency valve control unit 620 may be implemented by one or more computers 10 communicating across one or more networks 30 and accessible by a user 5. An example of computer system 10 may include, but is not limited to, a flight control computer installed on board an aircraft such as rotorcraft 101. In various embodiments, elements of emergency valve control unit 620 may be installed on board an aircraft, off-board (such as at a ground facility), or a combination of the two. For example, in one embodiment, some elements of emergency valve control unit 620 are installed on board the aircraft whereas other elements of emergency valve control unit 620 are installed off-board such that an onboard computer may include the capability to determine the appropriate instruction 625 during flight as well as the capability to upload/download information to an offboard computer between flights.

Computer system 10 may be used by emergency valve control unit 620 to input the data 615 from one or more sensor 610, determine whether to send an instruction 625 to valves 541, 542, and/or 543, and instruct valves 541, 542, and/or 543 to open or close. Users 5 may access emergency valve control unit 620 through computer systems 10. Users 5 may include any individual, group of individuals, entity, machine, and/or mechanism that interacts with computer systems 10. Examples of users 5 include, but are not limited to, a pilot, service person, engineer, technician, contractor, agent, and/or employee. Users 5 may be associated with an organization. An organization may include any social arrangement that pursues collective goals. One example of an organization is a business. A business is an organization designed to provide goods or services, or both, to consumers, governmental entities, and/or other businesses.

Computer system 10 may include processors 12, input/output devices 14, communications links 16, and memory 18. In other embodiments, computer system 10 may include more, less, or other components. Computer system 10 may be operable to perform one or more operations of various embodiments. Although the embodiment shown provides one example of computer system 10 that may be used with other embodiments, such other embodiments may utilize computers other than computer system 10. Additionally, embodiments may also employ multiple computer systems 10 or other computers networked together in one or more public and/or private computer networks, such as one or more networks 30.

Processors 12 represent devices operable to execute logic contained within a medium. Examples of processor 12 include one or more microprocessors, one or more applications, and/or other logic. Computer system 10 may include one or multiple processors 12.

Input/output devices 14 may include any device or interface operable to enable communication between computer system 10 and external components, including communication with a user or another system. Example input/output devices 14 may include, but are not limited to, a mouse, keyboard, display, and printer.

Network interfaces 16 are operable to facilitate communication between computer system 10 and another element of a network, such as other computer systems 10. Network interfaces 16 may connect to any number and combination of wireline and/or wireless networks suitable for data transmission, including transmission of communications. Network interfaces 16 may, for example, communicate audio and/or video signals, messages, internet protocol packets, frame relay frames, asynchronous transfer mode cells, and/or other suitable data between network addresses. Network interfaces 16 connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Memory 18 represents any suitable storage mechanism and may store any data for use by computer system 10. Memory 18 may comprise one or more tangible, computer-readable, and/or computer-executable storage medium. Examples of memory 18 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 18 stores logic 20. Logic 20 facilitates operation of computer system 10. Logic 20 may include hardware, software, and/or other logic. Logic 20 may be encoded in one or more tangible, non-transitory media and may perform operations when executed by a computer. Logic 20 may include a computer program, software, computer executable instructions, and/or instructions capable of being executed by computer system 10. Example logic 20 may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 20 may also be embedded within any other suitable medium without departing from the scope of the invention.

Various communications between computers 10 or components of computers 10 may occur across a network, such as network 30. Network 30 may represent any number and combination of wireline and/or wireless networks suitable for data transmission. Network may, for example, communicate internet protocol packets, frame relay frames, asynchronous transfer mode cells, and/or other suitable data between network addresses. Network 30 may include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. Although the illustrated embodiment shows one network 30, teachings of certain embodiments recognize that more or fewer networks may be used and that not all elements may communicate via a network. Teachings of certain embodiments also recognize that communications over a network is one example of a mechanism for communicating between parties, and any suitable mechanism may be used.

Lubrication arrangements 500b through 500d and emergency lubrication systems 540 and 560 are illustrated in the context of drive system 111 and 113; however, lubrication arrangement 500b through 500d and emergency lubrication systems 540 and 560 can be implemented on other types of aircraft. For example, an alternative embodiment may include a helicopter that has two or more gearboxes.

Lubrication arrangements 500b through 500d may have several advantages over lubrication arrangement 500a. One advantage may be the ability to use preheated oil in the event a loss of lubrication occurs in one of the lubrication systems. For example, if valve 542 is opened such that lubricant is allowed to flow from lubrication system 520 to lubrication system 510, the lubricant will be preheated because it was already circulating within lubrication system 520.

Another advantage of lubrication arrangements 500b through 500d may be the reduction of weight over lubrication arrangement 500a. For example, some embodiments recognize the ability to use existing oil pumps and reservoirs within the lubrication systems, as opposed to the separate tank and pump that may be included in lubrication arrangement 500a.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A rotorcraft comprising:
   a drive system, the drive system comprising:
   a first gearbox assembly;
   a second gearbox assembly, wherein the first gearbox assembly is in mechanical communication with the second gearbox assembly;
   a first lubrication system associated with the first gearbox assembly;
   a second lubrication system associated with the second gearbox assembly;
   a valve operable to allow lubricant to be delivered from the first lubrication system to the second gearbox assembly when the valve is open; and
   a control unit operable, at least in part, to instruct the valve to open or close.

2. The rotorcraft of claim 1, wherein the first lubrication system and the second lubrication system are not in fluid communication when the valve is closed.

3. The rotorcraft of claim 1, wherein control unit is further operable, at least in part, to:
   receive a rotorcraft parameter;
   compare the rotorcraft parameter to a threshold value; and
   instruct the valve to open when the rotorcraft parameter is less than the threshold value.

4. The rotorcraft of claim 3, wherein the rotorcraft parameter is at least one of a pressure or a level associated with lubricant within the second lubrication system.

5. The rotorcraft of claim 1, wherein the valve is a solenoid valve.

6. The rotorcraft of claim 1, wherein the drive system is operable to rotate a rotor blade.

7. The rotorcraft of claim 1, wherein the drive system is operable to provide power to one or more accessory devices.

8. The rotorcraft of claim 1, wherein
   the first lubrication system comprises:
   a pump;
   a filter; and
   at least one lubrication line; and
   the second lubrication system comprises:
   a pump;
   a filter; and
   at least one lubrication line.

9. The rotorcraft of claim 1, wherein the valve is a first valve, the drive system further comprising:
   a second valve operable to allow lubricant to be delivered from the second lubrication system to the first gearbox assembly when the second valve is open, wherein the control unit is further operable, at least in part, to instruct the second valve to open or close.

10. The rotorcraft of claim 9, the drive system further comprising:
    a third gearbox assembly;
    a third lubrication system associated with the third gearbox assembly; and
    a third valve operable to allow lubricant to be delivered from the first lubrication system to the third gearbox assembly, wherein the control unit is further operable, at least in part, to instruct the third valve to open or close.

11. The rotorcraft of claim 10, wherein the drive system is a first drive system, the rotorcraft further comprising:
    a second drive system, the second drive system further comprising:
    a first gearbox assembly;
    a second gearbox assembly, wherein the first gearbox assembly is in mechanical communication with the second gearbox assembly;
    a first lubrication system associated with the first gearbox assembly;
    a second lubrication system associated with the second gearbox assembly; and
    a valve operable to allow lubricant to be delivered from the first lubrication system to the second gearbox assembly when the valve is open, wherein the control unit is further operable, at least in part, to instruct the valve to open or close.

12. The rotorcraft of claim 11, wherein the second drive system is operable to rotate a rotor blade.

13. The rotorcraft of claim 11, wherein the second drive system is operable to provide power to one or more accessory devices.

14. The rotorcraft of claim 11, wherein the valve of the second drive system is a solenoid valve.

15. The rotorcraft of claim 11, wherein
the first lubrication system of the second drive system comprises:
  a pump;
  a filter; and
  at least one lubrication line; and
the second lubrication system of the second drive system comprises:
  a pump;
  a filter; and
  at least one lubrication line.
16. The rotorcraft of claim 11, further comprising:
an interconnect driveshaft, wherein the interconnect driveshaft is in mechanical communication with the third gearbox assembly and the interconnect driveshaft is in mechanical communication with the first gearbox assembly of the second drive system.

17. The rotorcraft of claim 16, further comprising:
  a first engine in mechanical communication with the first drive system; and
  a second engine in mechanical communication with the second drive system.
18. The rotorcraft of claim 17, wherein the first drive system is operable to provide power to the second drive system via the interconnect driveshaft when the second engine is inoperable.
19. The rotorcraft of claim 17, wherein the second drive system is operable to provide power to the first drive system via the interconnect driveshaft when the first engine is inoperable.
20. The rotorcraft of claim 1, wherein the control unit is a computing device comprising:
  at least one memory element operable to store data; and
  at least one processor operable to execute instructions associated with the data.

* * * * *